(12) United States Patent
Lohbreyer et al.

(10) Patent No.: US 8,978,629 B2
(45) Date of Patent: Mar. 17, 2015

(54) EXHAUST GAS RECIRCULATION COOLING ELEMENT FOR AN INTERNAL COMBUSTION ENGINE

(75) Inventors: Martin Lohbreyer, Dorsten (DE); Dietmar Krauss, Hückeswagen (DE); Dietmar Abendroth, Voerde (DE)

(73) Assignee: GEA Maschinenkühltechnik GmbH, Herne (DE)

( * ) Notice: Subject to any disclaimer, the term of this patent is extended or adjusted under 35 U.S.C. 154(b) by 1258 days.

(21) Appl. No.: 12/747,551

(22) PCT Filed: Dec. 12, 2008

(86) PCT No.: PCT/DE2008/002062
§ 371 (c)(1),
(2), (4) Date: Sep. 17, 2010

(87) PCT Pub. No.: WO2009/074147
PCT Pub. Date: Jun. 18, 2009

(65) Prior Publication Data
US 2011/0185714 A1    Aug. 4, 2011

(30) Foreign Application Priority Data

Dec. 12, 2007  (DE) .................. 10 2007 060 300
Feb. 28, 2008  (DE) .................. 10 2008 011 557

(51) Int. Cl.
*F02M 25/07* (2006.01)
*F28D 7/16* (2006.01)
*F28F 1/32* (2006.01)
*F28F 9/26* (2006.01)
*F28D 21/00* (2006.01)

(52) U.S. Cl.
CPC .............. *F28D 7/1623* (2013.01); *F28D 7/163* (2013.01); *F28F 1/32* (2013.01); *F28F 9/26* (2013.01); *F28D 21/0003* (2013.01)
USPC .................................... 123/568.12

(58) Field of Classification Search
CPC ....................... F02M 25/0734; F02M 25/0737
USPC ............ 123/568.12, 542, 698; 165/150, 151, 165/159, 103, 153, 158; 60/320, 60.25; 701/108
See application file for complete search history.

(56) References Cited

U.S. PATENT DOCUMENTS

| 1,542,613 A | 6/1925 | Cox |
| 3,442,324 A | 5/1969 | Clay, Jr. et al. |

(Continued)

FOREIGN PATENT DOCUMENTS

| DE | 37 37 433 A1 | 5/1988 |
| EP | 0 285 504 A1 | 3/1988 |

(Continued)

*Primary Examiner* — Stephen K Cronin
*Assistant Examiner* — Robert Werner
(74) *Attorney, Agent, or Firm* — Henry M. Feiereisen LLC

(57) ABSTRACT

The invention relates to an exhaust gas recirculation cooling element (1) comprising a heat exchanger (2) having several heat exchange units (11, 12, 13) that are introduced between the inflow region (3) and the outflow region (7) of the exhaust gas (AG). Said units comprise cooling tubes with cooling ribs. The heat exchanger (2) is surrounded by a housing (16), the lateral walls thereof (19) being arranged at a distance in relation to the perforated lateral walls (10). Guide channels (28) are arranged between the closed lateral walls (9) of the heat exchanger (2) and the adjacent lateral walls (20) of the housing (16), said guide channels extending in a diagonal manner and being provided to direct the coolant (KM) from a coolant inlet to the coolant outflow through the individual heat exchange units (11, 12, 13).

17 Claims, 3 Drawing Sheets

(56) References Cited

U.S. PATENT DOCUMENTS

| | | | |
|---|---|---|---|
| 4,924,938 A * | 5/1990 | Plaschkes | 165/158 |
| 5,303,770 A * | 4/1994 | Dierbeck | 165/140 |
| 6,349,761 B1 * | 2/2002 | Liu et al. | 165/151 |
| 6,578,627 B1 | 6/2003 | Liu et al. | |
| 2007/0131401 A1 | 6/2007 | Daly et al. | |

FOREIGN PATENT DOCUMENTS

| | | | |
|---|---|---|---|
| EP | 285504 A1 * | 10/1988 | |
| EP | 1 225 409 A | 7/2002 | |
| FR | 2816043 | 10/2000 | |
| FR | 2816043 A1 * | 5/2002 | |
| GB | 734008 | 7/1955 | |
| GB | 2 198 832 A2 | 6/1988 | |
| GB | 2 198 833 A1 | 6/1988 | |
| JP | S58 213192 A | 12/1983 | |
| JP | S62 266391 | 11/1987 | |
| JP | 2002 28775 A | 8/2003 | |
| JP | 2004 3447242 A | 12/2004 | |
| JP | 2006057473 A | 3/2006 | |
| JP | 2006 57473 A | 9/2007 | |
| JP | 2007 85331 A1 | 11/2008 | |

\* cited by examiner

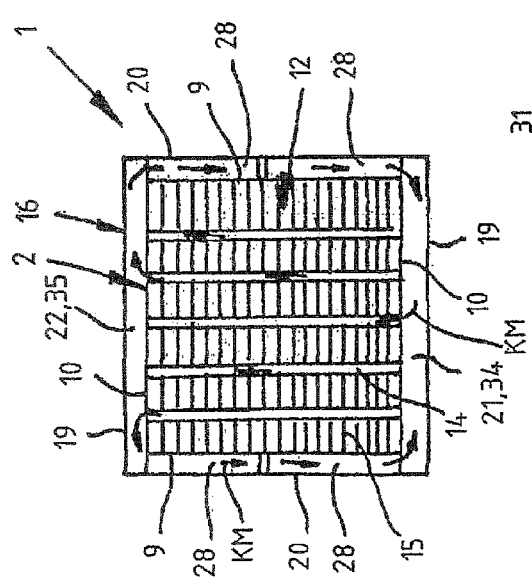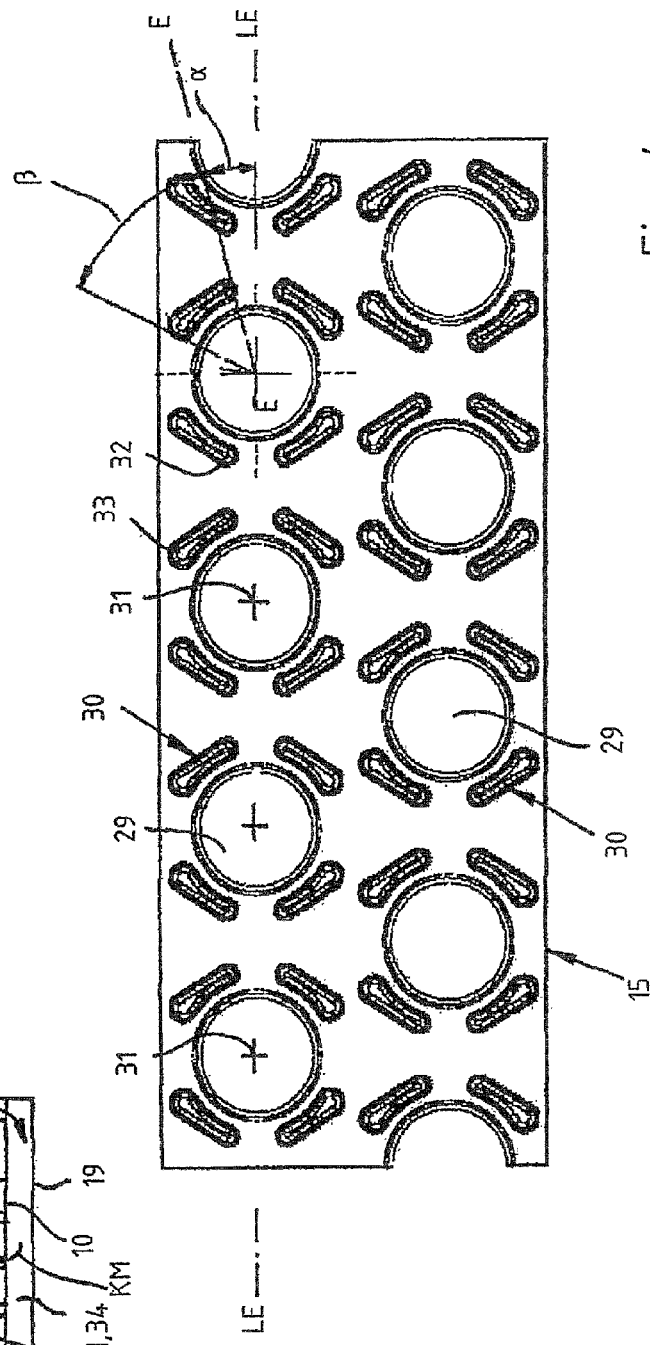

EXHAUST GAS RECIRCULATION COOLING ELEMENT FOR AN INTERNAL COMBUSTION ENGINE

CROSS-REFERENCES TO RELATED APPLICATIONS

This application is the U.S. National Stage of International Application No. PCT/DE2008/002062, filed Dec. 12, 2008, which designated the United States and has been published as International Publication No. WO 2009/074147 and which claims the priority of German Patent Applications, Serial No. 10 2007 060 300.4, filed Dec. 12, 2007, and Serial No. 10 2008 011 557.6, filed Feb. 28, 2008, pursuant to 35 U.S.C. 119(a)-(d).

BACKGROUND OF THE INVENTION

The invention relates to an exhaust gas recirculation cooling element for an internal combustion engine.

The use of exhaust gas recirculation cooling elements in the automobile sector is well known. However, these exhaust gas recirculation cooling elements have a problem with inadequate effectiveness. This is primarily due to the insufficient surface area ratio in the order of approximately 1:1 between the cooling water side and the exhaust gas side. This problem of insufficient effectiveness is evident, in particular, with exhaust gas recirculation cooling elements used with larger internal combustion engines, referring to internal combustion engines used in the maritime industry on ships or on heavy construction vehicles. The employed exhaust gas recirculation cooling elements used in this environment are exposed to completely different power levels than the exhaust gas recirculation cooling elements employed in the automobile sector, where significantly smaller internal combustion engines are used. In addition, the fuel used in large internal combustion engines has a somewhat different composition.

A significant aspect in exhaust gas recirculation cooling of internal combustion engines with high output power is that large exhaust gas quantities need to be cooled by recirculation, wherein the exhaust gas introduces a significant amount of heat into the exhaust gas recirculation cooling element. Of course, the temperature of the exhaust gas can be reduced with sufficiently large exhaust gas recirculation cooling elements; however, it is desirable to construct the exhaust gas recirculation cooling element as compact as possible. In addition, care must be taken that the housing of the exhaust gas recirculation cooling element is not excessively heated.

It is an object of the invention to provide an exhaust gas recirculation cooling element particularly for a internal combustion engine with high output power, wherein the exhaust gas recirculation cooling element should still be compact while also preventing excessive heating of its housing.

SUMMARY OF THE INVENTION

This object is attained with an exhaust gas recirculation cooling element.

The exhaust gas recirculation cooling element of the invention includes a housing with fittings for a coolant, with a heat exchanger insert with at least one heat exchange unit arranged in the housing. The heat exchange unit has several cooling pipes, through which coolant flows, with exterior cooling fins. Guide channels for guiding coolant from and to the cooling pipes are formed between the heat exchanger insert and the housing. Because the heat exchange unit has cooling pipes with exterior fins, the heat exchanger surface on the exhaust gas side is significantly greater than the heat exchanger surface on the coolant side. The use of cooling fins in exhaust gas recirculation cooling elements is not without problems, in particular when the cooling fins are very thin and closely spaced, because the exhaust gas is loaded with particles which can adhere to the cooling fins and therefore impede the flow and, as a result, the heat exchange. On the other hand, a compact exhaust gas recirculation cooling element is difficult to implement without increasing the heat exchanger surface on the exhaust side, in particular if a very large quantities of exhaust gas must be re-cooled. In the context of the present invention, it is would be advantageous to provide the exhaust gas recirculation cooling element with an exchangeable heat exchanger insert, in order to periodically exchange or to clean the heat exchanger insert.

Another important aspect is that guide channels for guiding coolant from and to the cooling pipes are formed between the heat exchanger insert and the housing. This means that the coolant is directly in contact with the housing in the region of the guide channels, thereby cooling the housing which forms the outer jacket of the exhaust gas recirculation cooling element. This also prevents overheating of the housing even with very high heat loading.

Because the housing typically does not need to be exchanged, at least a part of the housing can also be formed by the engine block or an engine component, such as a housing of a charge cooler. A second housing half which is attached, for example, to the housing section of the engine block, is then used as a cover. Additional heat flow into the heat exchange units via the engine block or via another engine component functioning as a housing section is then minimal, because the guide channels, through which the coolant flows, extend between the heat exchange unit and the housing.

The exhaust gas recirculation cooling element according to the invention is therefore based on a very compact, almost double-walled housing concept, similar to a double-wall housing, with a high-efficiency, preferably exchangeable, heat exchanger insert.

In an advantageous embodiment, the heat exchanger insert has two closed sidewalls and two perforated sidewalls, with the cooling pipes being attached in the perforated sidewalls. The heat exchanger insert therefore forms an inner housing located inside the outer housing. The inner housing and the heat exchanger insert are enclosed by the outer housing at least in the region of the heat exchange units. Preferably, the housing has a rectangular cross section. The heat exchanger insert has also a rectangular cross section, thereby producing guide channels of substantially uniform thickness or uniform cross-sectional area, in particular in the region of the closed sidewalls, but also in the region of the perforated sidewalls.

In order to guide the coolant flow to a coolant inlet side of a heat exchange unit, ribs which are either formed on the housing or on the heat exchanger insert extend between the housing and the sidewalls of the heat exchanger insert. With a well-designed flow path, several heat exchange units can be connected sequentially without connecting the individual heat exchange units with one another with cooling pipes. Instead, the coolant flows out of the coolant outlet side of a first heat exchange unit and into the coolant inlet side of another heat exchange unit by way of transfer via the guide channels. The coolant inlet side and the coolant outlet side of adjacent heat exchange units are hereby located, in particular, on opposing sides of the heat exchanger insert, so that the coolant has a relatively long path from the coolant outlet side of a first heat exchange unit to the coolant inlet side of another heat exchange unit. This is intentional, so as to cool the housing sufficiently. By guiding the coolant in this way, it flows through the cooling pipes of all heat exchange units in the same direction. It can also not be excluded in the context of the present invention that the flow through the cooling pipes of immediately consecutive heat exchange units is in opposite directions. In this case, the coolant is guided through the heat exchanger insert in a meander pattern.

In an advantageous embodiment of the invention, the heat exchanger insert has on one end an inflow region for hot exhaust gas and on another end an outflow region for cooled exhaust gas. Advantageously, the inflow and outflow regions of the heat exchanger insert have a conical shape. These inflow and outflow regions form in conjunction with the heat exchange units the heat exchanger insert which may be inserted in the exhaust gas recirculation cooling element as a prefabricated component having the form of a cuboid with cupped conical inflow and outflow regions. The housing of the exhaust gas recirculation cooling element encloses the heat exchanger insert with its inflow and outflow regions like a jacket. The guide channels for the coolant extend into the conical inflow and outflow regions of the heat exchanger insert, thereby preventing excessive heating of the housing also in these regions.

Advantageously, the cooling water inlet is arranged in the outflow region of the exhaust gas, whereas the cooling water outlet is arranged in said inflow region of the exhaust gas.

Although the design of the exhaust gas recirculation cooling element according to the invention produces not only a significantly more effective heat exchange between the exhaust gas and the coolant while at the same time cooling the housing more effectively, is an important aspect of the invention to provide a heat exchanger surface on the exhaust gas side, which is greater by approximately a factor of 8 to 20, in particular 8 to 14, than on the coolant side, in order to attain the desired greater heat exchange efficiency between the exhaust gas and the coolant.

Because of the coolant inlet is arranged in the outflow region of the exhaust gas and the coolant outlet is arranged in the inflow region of the exhaust gas, heat exchange between the exhaust gas and the coolant occurs as a cross-counterflow. The coolant inlet and the coolant outlet are formed, in particular, as fittings on the respective opposite ends of the housing.

Particularly important for the effectiveness of the exhaust gas recirculation cooling element is a ratio of the heat exchanger areas. The area of the cooling fins should be as large as possible, however, without risking premature contamination. Accordingly, the cooling fins of the cooling pipes are made of sheet metal and extend across the entire cross-section of a heat exchange unit. In other words, the cooling fins extend from one cooling pipe to the next cooling pipe, or the cooling pipes pass through a series of stacked sheet metal forming the cooling fins of the heat exchange unit.

The cooling pipes pass through openings in the sheet metal, wherein the region outside the openings is referred to as cooling fin. Trough-shaped turbulators are provided in the cooling fins along the periphery of the openings. The turbulators increase the heat exchange and hence the effectiveness of the exhaust gas recirculation cooling element.

All turbulators of a sheet or of a cooling fin are preferably embossed in one direction. This configuration ensures that as few soot particles from the exhaust gas as possible adhere to the turbulators or cooling fins. Inspection and maintenance intervals can thus be extended.

It has been observed that the effect of the turbulators is further improved when they are kidney-shaped, whereby four of these kidney-shaped turbulators are arranged peripherally around each opening in a cooling fin.

In an advantageous embodiment, the lengths of the turbulators is limited, and they extend each over an angle of about 50° to 60° along the peripheral side of an opening. This results in an angle of 30° to 40° between two turbulators, where no impressions are located in a sheet metal.

One important design aspects of the turbulators is that they are closed along the edge and have soft, rounded transitions to the sheet metal to prevent soot particles from adhering to any sharp edges. The turbulators are arranged so that two corresponding thin ends of the turbulators or two corresponding thick ends of the turbulators, respectively, are always located next to one another. This results in a point-symmetric arrangement with respect to the center of the individual openings and a mirror-symmetric arrangement with respect to the longitudinal plane of the openings.

The turbulators are oriented so that the turbulators in front of an opening, as viewed in the flow direction, face the flow with their narrower ends. Accordingly, the turbulator pair, which is arranged subsequent to the opening, as viewed in the flow direction, is oriented with its thin ends pointing in the flow direction.

Because of the aggressiveness of the exhaust gases, the heat exchanger insert is preferably made of stainless steel.

BRIEF DESCRIPTION OF THE DRAWING

The invention will now be described with reference to an exemplary embodiment illustrated in the drawings. It is shown in:

FIG. 3 a vertical cross-section through the line III-III of FIG. 2 as viewed in the direction of the arrows IIIa; and FIG. 4 a top view of a cooling fin for receiving cooling pipes.

DETAILED DESCRIPTION OF PREFERRED EMBODIMENTS

Figure 1:
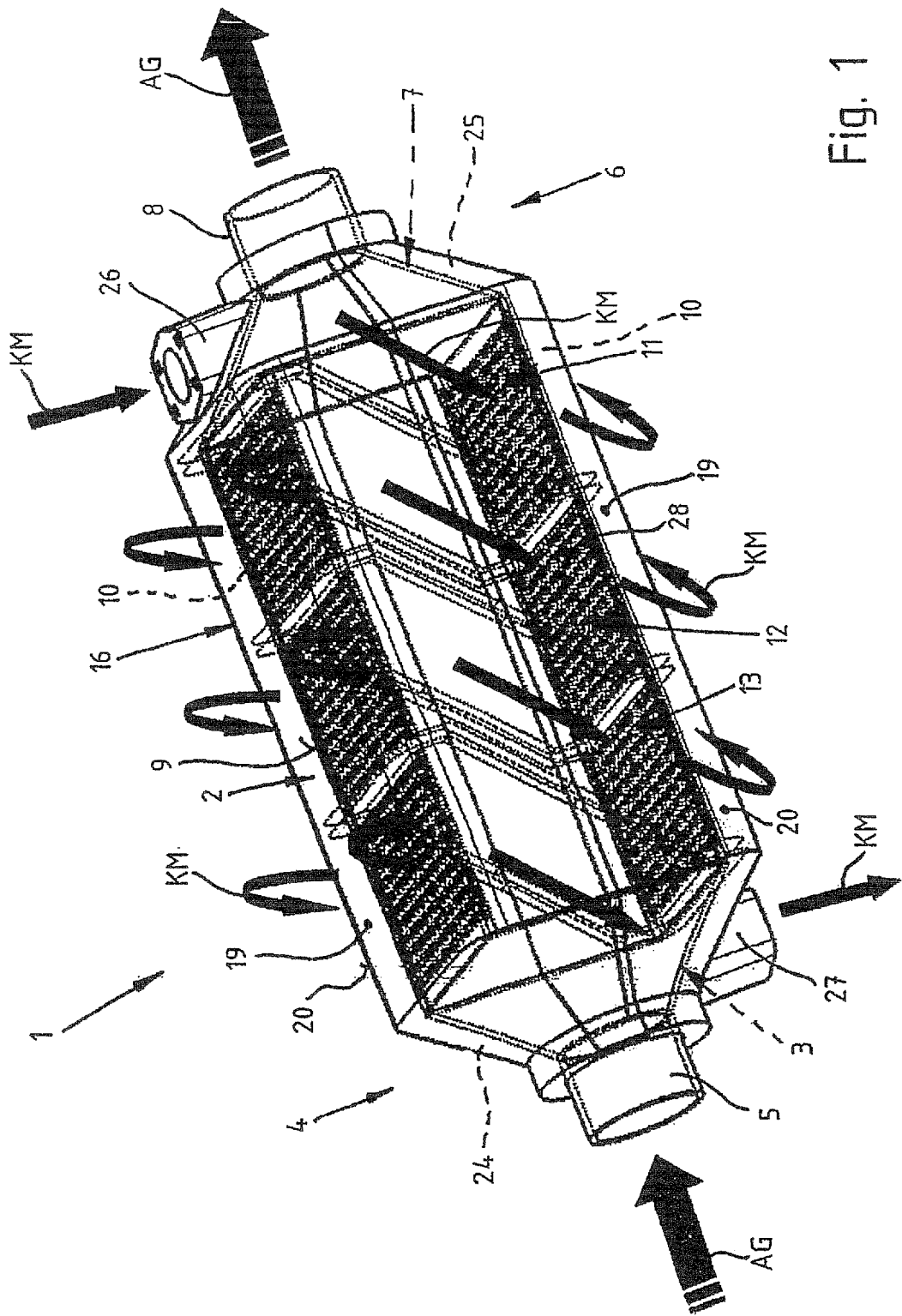
FIG. 1 an exhaust gas recirculation cooling element in a schematic perspective view.
Figure 2:
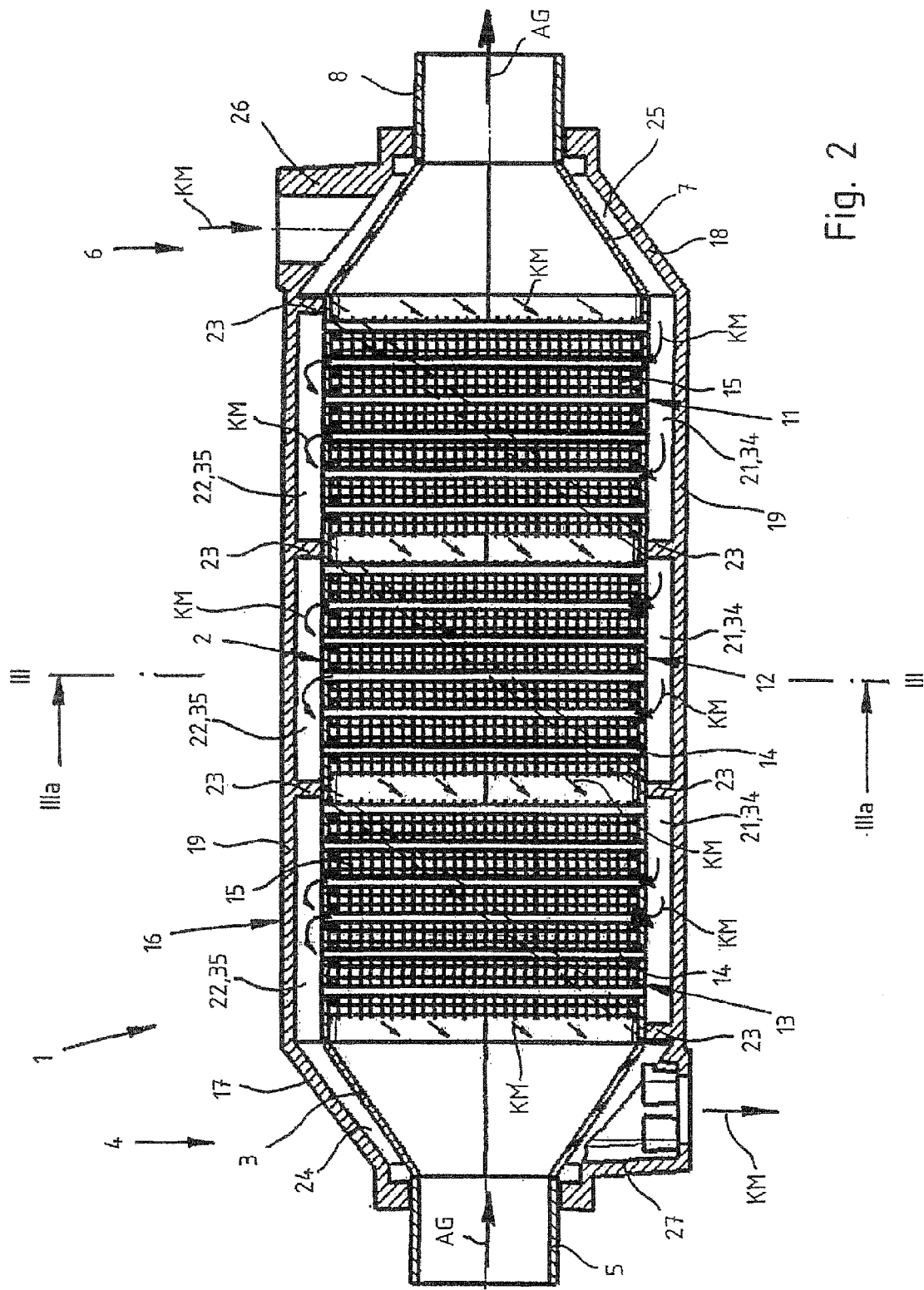
FIG. 2 a vertical longitudinal section through the exhaust gas recirculation cooling element of FIG. 1.

FIGS. 1 to 3 show with the reference symbol 1 an exhaust gas recirculation cooling element for an otherwise unillustrated large internal combustion engine installed, for example, on a ship. In the exhaust gas recirculation cooling element 1, hot exhaust gas AG exiting the internal combustion engine is in indirect heat exchange with a coolant KM in form of cooling water.

The exhaust gas recirculation cooling element 1 has a heat exchanger insert 2 with a rectangular cross-section and a conical inflow region 3 for hot exhaust gas AG at one end 4. The inflow region 3 is located downstream of an inflow fitting 5 for the hot exhaust gas AG. A conical outflow region 7 of the heat exchanger insert 2 for the cooled exhaust gas AG is located at the other end 6 of the exhaust gas recirculation cooling element 1. The outflow region 7 transitions into a cylindrical discharge fitting 8 for the cooled exhaust gas AG.

The heat exchanger insert 2 has two opposing closed sidewalls 9 and two perforated sidewalls 10 which are offset by 90° relative to the sidewalls 9 (FIG. 3). The heat exchanger insert 2 has three heat exchange units 11, 12, 13 which are sequentially arranged in the flow direction of the exhaust gas AG. They are constructed of a plurality of cooling pipes 14 oriented perpendicular to the flow direction of the exhaust gas AG and of cooling fins 15 made of corrugated sheet metal through which the cooling pipes 14 pass (FIG. 2 to FIG. 4).

The heat exchanger insert 2 is enclosed by a housing 16 which has a conical first end region 17, a conical second end region 18 and four sidewalls 18, 19 enclosing right angles and arranged between the end regions 17, 18.

Due to the conical inflow and outflow regions 3, 7 of the heat exchanger insert 2 and the conical end regions 17, 18 of the housing 16, conical annular gaps 24, 25 are formed at the ends 4, 6 of the exhaust gas recirculation cooling element 1.

Inlet chambers 21 are formed on a coolant inlet side 34 and outlet chambers 22 are formed on the coolant outlet side 35 for the coolant KM between the perforated sidewalls 10 of the heat exchanger insert and the sidewalls 19 of the housing 16 which extend parallel to the perforated sidewalls 10, wherein the inlet chambers 21 and the outlet chambers 22 of each exchange unit 11, 12, 13 are separated water-tight from the inlet chambers 21 and the outlet chambers 22 of the adjacent heat exchange unit 11, 12, 13 by ribs 23.

The inlet chamber 21 of the heat exchange unit 11 is connected with the annular gap 25, whereas the outlet chamber 22 of the heat exchange unit 13 is connected with the annular gap 24. The annular gap 25 is connected to a fitting 26 supplying the coolant KM, whereas the annular gap 24 is connected to a fitting 27 discharging the heated coolant KM.

In addition to the closed sidewalls 9 of the heat exchanger insert 2 and the adjacent sidewalls 20 of the housing 16 (see in particular FIG. 4), diagonal guide channels 28 for transferring the coolant KM extend from the coolant fitting 26 across the heat exchange units 11, 12, 13 to the coolant fitting 27, as will be described below.

The coolant KM flows from the coolant inlet 26 in the outflow region 7 of the cooled exhaust gas AG to the conical annular gap 25 between the heat exchanger insert 2 and the housing 16 on the end 6. From here, the coolant KM flows via the two lateral guide channels 28 into the inlet chamber 21 of the heat exchange unit 11 adjacent to the outflow region 7. The coolant KM then flows from the inlet chamber 21 through the cooling pipes 14 of the heat exchange unit 11 and into its outlet chamber 22. From here, the coolant KM flows through the diagonal lateral guide channels 28 to the inlet chamber 21 of the adjacent heat exchange unit 12, from here through the cooling pipes 14 of this heat exchange unit 12 to its respective outlet chamber 22, and from this outlet chamber 22 via the diagonal lateral guide channels 28 into the inlet chamber 21 of the heat exchange unit 13 adjacent to the inflow region 3. The coolant KM flows here likewise through the cooling pipes 14 to the outlet chamber 22 of this heat exchange unit 13 and then flows from the outlet chamber 22 via the diagonal lateral guide channels 28 into the conical annular gap 24 between the conical inflow region 3 of the heat exchanger insert 2 and the likewise conical end region 17 of the housing 16, where it exits from this conical annular gap 24 through the coolant outlet 27 in a heated state.

The cooling fins 15 arranged along the periphery of the cooling pipes 14 are made, as already mentioned, from sheet metal and provided with openings 29 (FIG. 4) which extend across the entire cross-section of a heat exchange unit 11, 12, 13. Embossed trough-shaped turbulators 30 are provided along the periphery of the openings 29 that receive the cooling pipes 14. The turbulators 30 are embossed from the cooling fins 15 in one direction.

The turbulators 30 are kidney-shaped and have a curvature adapted to the contour of the openings 29. Four turbulators 30 are arranged around the periphery of a respective opening 29 in a cooling fin 15.

The ends 32 of the turbulators 30 located in a longitudinal plane LE spanned by the axes 31 of the openings 29 which are sequentially arranged in the flow direction of the exhaust gases AG have a smaller radius than the other ends 33. The angle $\alpha$ between a plane E bisecting the axis 31 of an opening 29 of a fin 15 and the end 32 of a turbulator 30 located adjacent to the longitudinal plane LE and the longitudinal plane LE is about 15°. The turbulators 30 extend over an angle $\beta$ of about 50° to 60° along the periphery of an opening 29.

The housing 16 is separated along the horizontal longitudinal center plane, so that the heat exchanger insert 2 arranged in the housing 16 can be exchanged. The heat exchanger insert 2 and the heat exchange units 11, 12, 13 are made of stainless steel.

The invention claimed is:

1. An exhaust gas recirculation cooling element for an internal combustion engine, comprising:
   a housing having coolant fittings,
   a heat exchanger insert having two closed sidewalls and two perforated sidewalls and at least peripherally surrounded by the housing, with the heat exchanger insert comprising a heat exchange unit arranged in the housing and including a plurality of cooling pipes having external cooling fins and configured for flow-through of a coolant, with the plurality of cooling pipes secured to the perforated sidewalls;
   guide channels for transporting the coolant from and to the plurality of cooling pipes, said guide channels configured as a gap disposed between the heat exchanger insert and the sidewalls of the housing; and
   a plurality of ribs for delimiting the guide channels, wherein the ribs are formed on the housing and oriented inwardly or are formed on the heat exchanger insert and oriented outwardly,
   wherein the ribs are oriented diagonally in the region of the closed sidewalls, so that the diagonal guide channels are formed for transferring the coolant to a coolant inlet side and from a coolant outlet side of the heat exchange unit along the closed sidewalls, and wherein the heat exchanger insert is exchangeable from the housing in a non-destructive manner.

2. The exhaust gas recirculation cooling element of claim 1, wherein the heat exchanger insert comprises plurality of sequentially connected heat exchange units.

3. The exhaust gas recirculation cooling element of claim 2, wherein coolant flowing out of a first of the plurality of heat exchange unit enters a second heat exchange unit located downstream of the first heat exchange unit by way of the guide channels.

4. The exhaust gas recirculation cooling element of claim 2, wherein the cooling pipes of the plurality of heat exchange units have coolant flow in an identical direction.

5. The exhaust gas recirculation cooling element of claim 2, wherein the cooling pipes of the plurality of heat exchange units have coolant flow in a counterflow direction.

6. The exhaust gas recirculation cooling element of claim 1, wherein the heat exchanger insert has at a first end an inflow region for hot exhaust gas and at a second end an outflow region for cooled exhaust gas.

7. The exhaust gas recirculation cooling element of claim 6, wherein the inflow and outflow regions of the heat exchanger insert have a conical shape.

8. The exhaust gas recirculation cooling element of claim 7, wherein the coolant inlet is provided in the outflow region and the coolant outlet is provided in the inflow region.

9. The exhaust gas recirculation cooling element of claim 1, wherein the cooling fins are made of sheet metal and extend across an entire cross-section of a heat exchange unit.

10. The exhaust gas recirculation cooling element of claim 9, wherein the cooling fins comprise an opening through with the cooling pipes pass and trough-shaped turbulators disposed along the periphery of the opening, with the turbulators formed as depressions in the cooling fins.

11. The exhaust gas recirculation cooling element of claim 10, wherein the depressions are oriented in an identical direction normal to a surface of the cooling fins.

12. The exhaust gas recirculation cooling element of claim 10, wherein the turbulators are kidney-shaped.

13. The exhaust gas recirculation cooling element of claim 12, wherein a cooling fin has four turbulators distributed along the periphery of an opening.

14. The exhaust gas recirculation cooling element of claim 10, wherein the turbulators have first and second ends, with a first end of the turbulators located adjacent to a longitudinal plane extending through axes defined by consecutively arranged openings in a flow direction having a smaller radius than the second end.

15. The exhaust gas recirculation cooling element of claim 14, wherein a first angle enclosed between, on one hand, a plane bisecting the axis of an opening and the first end of a turbulator located adjacent to the longitudinal plane and, on the other hand, the longitudinal plane is about 15°.

16. The exhaust gas recirculation cooling element of claim 10, wherein the turbulators extend over a second angle of about 50° to 60° along the periphery of an opening.

17. The exhaust gas recirculation cooling element of claim 1, wherein the heat exchanger insert is made of stainless steel.

* * * * *